United States Patent
Song (10) Patent No.: US 11,489,169 B2
(45) Date of Patent: Nov. 1, 2022

(54) METHOD OF MANUFACTURING ANODE DUAL CATALYST FOR FUEL CELL FOR PREVENTING REVERSE VOLTAGE PHENOMENON AND DUAL CATALYST MANUFACTURED THEREBY

(71) Applicants: Hyundai Motor Company, Seoul (KR); Kia Motors Corporation, Seoul (KR)

(72) Inventor: You Jung Song, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 209 days.

(21) Appl. No.: 16/679,649

(22) Filed: Nov. 11, 2019

(65) Prior Publication Data

US 2021/0036333 A1 Feb. 4, 2021

(30) Foreign Application Priority Data

Jul. 30, 2019 (KR) .................. 10-2019-0092530

(51) Int. Cl.
*H01M 4/90* (2006.01)
*H01M 4/92* (2006.01)
*H01M 4/86* (2006.01)
*H01M 4/88* (2006.01)

(52) U.S. Cl.
CPC ....... *H01M 4/9058* (2013.01); *H01M 4/8647* (2013.01); *H01M 4/8803* (2013.01); *H01M 4/8817* (2013.01); *H01M 4/8825* (2013.01); *H01M 4/9016* (2013.01); *H01M 4/9025* (2013.01); *H01M 4/9033* (2013.01); *H01M 4/9041* (2013.01); *H01M 4/9075* (2013.01); *H01M 4/9083* (2013.01); *H01M 4/92* (2013.01); *H01M 4/921* (2013.01); *H01M 4/923* (2013.01); *H01M 4/925* (2013.01); *H01M 4/926* (2013.01); *Y02E 60/50* (2013.01)

(58) Field of Classification Search
None
See application file for complete search history.

(56) References Cited

U.S. PATENT DOCUMENTS 7,811,959 B2 * 10/2010 Lee ................ H01M 4/8605 502/180
2017/0187042 A1 * 6/2017 Jang ................ H01M 4/8853

FOREIGN PATENT DOCUMENTS

| JP | 2005332662 | * 12/2005 |
| JP | 2007117835 | * 5/2007 |
| JP | 2017016895 | * 1/2017 |
| KR | 20160038301 A | 4/2016 |
| KR | 20160127535 A | 11/2016 |
| KR | 101949607 B1 | 2/2019 |

* cited by examiner

*Primary Examiner* — Jonathan Crepeau
(74) *Attorney, Agent, or Firm* — Fox Rothschild LLP (57) ABSTRACT

Disclosed are a method of manufacturing an anode dual catalyst for a fuel cell so as to prevent a reverse voltage phenomenon and a dual catalyst manufactured by the same. The method may include supporting effectively metal catalyst particles and oxide particles on a conductive support, and thus, a dual catalyst manufactured using the method may be suitably used for controlling a reverse voltage phenomenon that occurs at the anode.

13 Claims, 10 Drawing Sheets

METHOD OF MANUFACTURING ANODE DUAL CATALYST FOR FUEL CELL FOR PREVENTING REVERSE VOLTAGE PHENOMENON AND DUAL CATALYST MANUFACTURED THEREBY

CROSS REFERENCE TO RELATED APPLICATION

The present application claims priority based on Korean Patent Application No. 10-2019-0092530, filed on Jul. 30, 2019, the entire content of which is incorporated herein for all purposes by this reference.

TECHNICAL FIELD

The present invention relates to a method of manufacturing an anode dual catalyst for a fuel cell for preventing a reverse voltage phenomenon and a dual catalyst manufactured by the same. Particularly, the method may include supporting effectively metal catalyst particles and oxide particles on a conductive support, and a dual catalyst manufactured using the method may be suitable for controlling a reverse voltage phenomenon that may occur at the anode.

BACKGROUND

Local hydrogen fuel depletion that may occur during the operation of a fuel cell may lead to a reverse voltage phenomenon, which may greatly affect the durability of a polymer electrolyte membrane fuel cell. Hence, an anode design for solving this problem is currently required. For example, when a reverse voltage phenomenon occurs during the operation of the fuel cell, the carbon support of the catalyst contained in the anode corrodes, resulting in cell failure. With the goal of solving this problem, it is necessary to design a reversal-tolerant anode (RTA) including a catalyst (oxygen evolution catalyst) that decomposes water to generate oxygen.

SUMMARY OF THE INVENTION

In preferred aspects, provided are a method of effectively preventing a reverse voltage phenomenon that may occur due to local hydrogen fuel depletion during the operation of a fuel cell, and a dual catalyst capable of facilitating the hydrogen oxidation reaction as well as exhibiting the function of an oxygen evolution catalyst.

Further provided is a method of increasing the activity of a catalyst per unit mass by improving the dispersibility of the catalyst.

Also provided is a method of manufacturing a catalyst, which may be applied to a large-capacity process through a chemical reduction method.

The objectives of the present invention are not limited to the foregoing, and will be able to be clearly understood through the following description and to be realized by the means described in the claims and combinations thereof.

In one aspect, provided is a method of manufacturing an anode dual catalyst for a fuel cell. The method may include: preparing a first composition by admixing materials including oxide particles and a first solvent component, forming a first complex by admixing materials including the dispersed oxide particles and a metal precursor, preparing a second composition by admixing materials including a conductive support and a second solvent component, and forming a second complex by combining the first complex and the second composition.

The admixing materials in respective steps may include dispersing the components or materials, for example, the first composition may be prepared by dispersing the oxide particles in the first solvent component; the first complex may be prepared by reacting the dispersed oxide particles with the metal precursor; and the second composition may be prepared by dispersing the conductive support in the second solvent component.

For example, the combining may be performed by supplying or adding the first complex to the second composition.

The first solvent component and the second solvent component may be same or different. Preferably, the first solvent component and the second solvent component may be different, for example, in density, boiling point or melting point, viscosity, molecular weight, formula (e.g., chemical formula), solubility or miscibility in water, dielectric constant, polarity or the like. Preferably, The first composition may suitably include the oxide particles in amount of about 0.3 to 10 wt % based on the total weight of the first composition.

The first solvent component may include a first alcohol solvent, e.g, high-boiling-point alcohol. The first alcohol solvent may suitably include a glycol that has two hydroxyl groups and a boiling point greater than about 150° C., greater than about 160° C., greater than about 170° C., greater than about 180° C., or greater than about 190° C. Exemplary first alcohol solvent may include ethylene glycol, propylene glycol, butanediol, propylene-1,3-diol, or the like.

The method may further include filtering the prepared first composition through a filter by applying pressure to the first composition.

The filter may be include a mesh having a sieve size of about 100 to 200 μm.

The pressure of about 10 to 1,500 bar may be applied to the first composition so that the first composition passes through the filter at a rate of about 50 to 100 ml/min.

The preparing the first complex may include preparing a metal precursor and forming metal catalyst particles on the surface of the oxide particles by reacting the metal precursor with the oxide particles.

The metal catalyst particles may suitably have a size of about 2.0 to 3.0 nm.

The first complex may suitably include the metal catalyst particles in an amount of about 1 to 50 wt % based on the total weight of the first complex.

The metal precursor with the oxide particles may be reacted at a pH of about 10 or greater and a temperature of about 150 to 180° C. for about 2 to 5 hr.

The second solvent component may include distilled water, a second alcohol solvent and combinations thereof. The second alcohol solvent may suitably include an alcohol solvent, e.g., typical alcohol, that has one hydroxyl group and a boiling point less than about 120° C., less than about 110° C., less than about 100° C., less than about 90° C., less than about 80° C., or less than about 70° C. Exemplary second alcohol solvent may include methanol, ethanol, propanol, isopropyl alcohol, butanol, or pentanol.

The preparing the second complex may include preparing an admixture including the first complex and the second composition by performing acid treatment, aging the admixture, and obtaining a solid by filtering the mixed solution.

The second composition may have a pH of about 7 to 8 and the admixture may have a pH of about 0 to 2.

In aging the mixed solution, the admixture may be aged with stirring for about 10 hr to 48 hr.

In an aspect, provided is an anode dual catalyst for a fuel cell. The anode dual catalyst may include a first complex including metal catalyst particles and oxide particles and a conductive support having the first complex attached to the surface thereof. Particularly, the metal catalyst particles may be attached to the surface of the oxide particles.

The metal catalyst particles may include one or more selected from the group consisting of platinum (Pt), palladium (Pd), iridium (Ir), rhodium (Rh), rhenium (Re), nickel (Ni), cobalt (Co), tungsten (W), molybdenum (Mo), niobium (Nb), gold (Au), and silver (Ag).

The metal catalyst particles may have a size of about 2.0 to 3.0 nm.

The first complex may suitably include the metal catalyst particles in an amount of about 1 to 50 wt % based on the total weight of the first complex.

Preferably, a size of the metal catalyst particles may be equal to or less than a size of the oxide particles, and the size of the oxide particles may be less than a size of the conductive support.

The oxide particles may include one or more selected from the group consisting of Ir oxide, Sr—Ir oxide, Fe—Co—W oxide, Ni—Co oxide, Co oxide, Ni—Fe oxide, Co—Fe oxide, La—Ni oxide, La—Fe oxide, La—Mn oxide, La—Co oxide, Pt oxide, La—Cr oxide, W oxide, and Ru oxide.

According to various exemplary embodiments of the present invention, an effect of preventing a reverse voltage phenomenon that occurs due to local hydrogen fuel depletion during the operation of a fuel cell may be provided.

According to various exemplary embodiments of the present invention, a dual catalyst capable of facilitating the hydrogen oxidation reaction as well as exhibiting the function of an oxygen evolution catalyst may also be provided.

According to various exemplary embodiments of the present invention, a method of increasing the activity of a catalyst per unit mass by improving the dispersibility of the catalyst may be provided.

According to various exemplary embodiments of the present invention, a method of manufacturing a catalyst, which can be applied to a large-capacity process through a chemical reduction method, may be provided.

The effects of the present invention are not limited to the foregoing, and should be understood to include all effects that can be reasonably anticipated from the following description.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Preferably, provided are a method of manufacturing an anode dual catalyst for a fuel cell for preventing a reverse voltage phenomenon and to a dual catalyst manufactured thereby.

In particular, the method of manufacturing the anode dual catalyst for a fuel cell according to the present invention may include preparing a first composition by dispersing oxide particles in a first solvent component, forming a first complex by reacting the dispersed oxide particles with a metal precursor, preparing a second composition by dispersing a conductive support in a second solvent component, and forming a second complex by combining the first complex and the second composition, for example, supplying or adding the first complex to the second composition.

Figure 1:
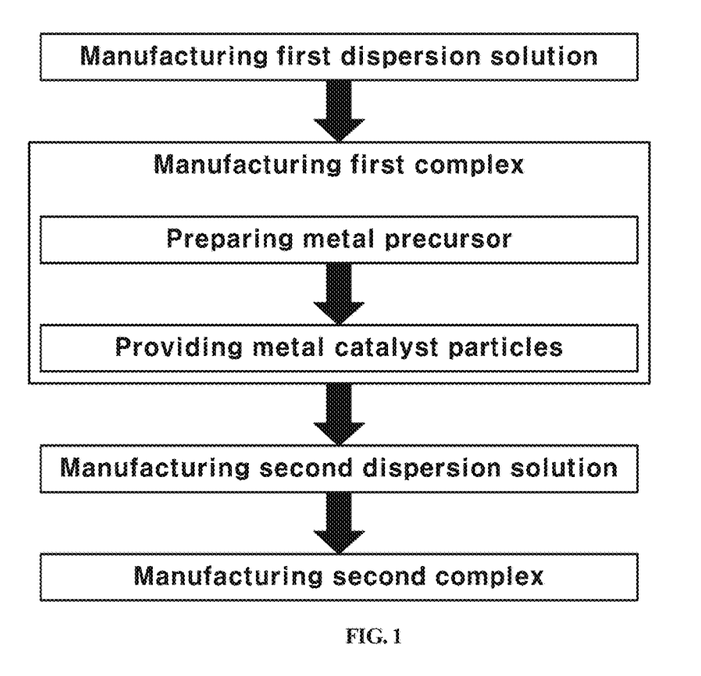
FIG. 1 is an exemplary flowchart showing an exemplary process of manufacturing an exemplary dual catalyst according to an exemplary embodiment of the present invention.

FIG. 1 is a flowchart showing an exemplary process of manufacturing the dual catalyst according to an exemplary embodiment of the present invention. With reference thereto, the steps thereof are described below.

Preparing a First Composition

Oxide particles may be dispersed in a solvent, thus preparing or manufacturing a first composition.

The oxide particles may include one or more selected from the group consisting of Ir oxide, Sr—Ir oxide, Fe—Co—W oxide, Ni—Co oxide, Co oxide, Ni—Fe oxide, Co—Fe oxide, La—Ni oxide, La—Fe oxide, La—Mn oxide, La—Co oxide, Pt oxide, La—Cr oxide, W oxide, and Ru oxide.

The oxide particles may suitably include iridium oxide ($IrO_2$).

The solvent contained in the first composition, the first solvent component, may suitably include a first alcohol solvent (e.g., high-boiling-point alcohol), and may include one or more of glycols, for example, ethylene glycol, propylene ethylene glycol and combinations thereof. Preferably, the viscosity of the high-boiling-point alcohol may be about 9 cP or greater at a temperature of about 25° C.

The first composition may suitably include an amount of about 0.1 to 15 wt %, preferably an amount of about 0.3 to 10 wt %, of the oxide particles, based on the total weight of the first composition. When the amount of the oxide particles is less than about 0.1 wt %, the reactor volume in the subsequent process may be so large that the process may be inefficient. On the other hand, when the amount of the oxide particle is greater than about 15 wt %, the viscosity of the first composition may be extremely high and thus stirring may be difficult.

In the present invention, after manufacturing the first composition, filtering the first composition through a filter may be further performed, e.g., by applying pressure to the first composition.

Preferably, the oxide particles may be added to the solvent to afford the first composition, which is then passed through the filter and thus dispersed. Here, the filter may be formed of a mesh having a sieve size of 100 to 200 μm. For example, the first composition may be passed through a nano disperser equipped with a 100 to 200 μm filter at a pressure of about 10 to 1,500 bar. The first composition may be passed through the filter at a rate of 50 to 100 ml/min. Preferably, a pressure of about 100 to 500 bar may be applied to the first composition, or particularly, a pressure of about 300 to 500 bar may be applied thereto. When the sieve size of the filter is greater than about 200 μm, the rate at which the first composition passes through the filter may be greater than about 100 ml/min, or the pressure applied to the first composition may be greater than about 1,500 bar, dispersibility of the first composition may become poor. On the other hand, when the sieve size of the filter is less than about 100 μm, the rate at which the first composition passes through the filter may be less than about 50 ml/min, or the pressure applied to the first composition may be less than about 10 bar, processability may deteriorate.

In addition, the first composition may be preferably passed two or more times through the filter.

Additionally, if necessary, the first composition may be dispersed using at least one device selected from a magnetic stirrer, an ultrasonic disperser, and an overhead homogenizer.

Forming a First Complex

The oxide particles dispersed in the solvent (first solvent component) may be reacted with a metal precursor, thus forming a first complex. Preferably, the first composition may be added with a precursor for metal catalyst particles acting as a catalyst in the electrode for a fuel cell, and the oxide particles of the first composition and the metal catalyst precursor may react, thus forming metal catalyst particles on the surface of the oxide particles.

For example, manufacturing the first complex may include preparing a metal precursor and providing metal catalyst particles.

Preparing Metal Precursor

A precursor for metal catalyst particles to be attached to the surface of the oxide particles may be prepared.

In the present invention, the metal catalyst particles may include one or more selected from the group consisting of platinum (Pt), palladium (Pd), iridium (Ir), rhodium (Rh), rhenium (Re), nickel (Ni), cobalt (Co), tungsten (W), molybdenum (Mo), niobium (Nb), gold (Au), and silver (Ag).

The metal catalyst particles may suitably include platinum (Pt) and the precursor thereof may suitably include platinum chloride.

Providing Metal Catalyst Particles

The metal precursor prepared above may be reacted with the oxide particles contained in the first composition, thereby providing the metal catalyst particles on the surface of the oxide particles. Preferably, the first complex including the metal catalyst particles and the oxide particles having the metal catalyst particles attached to the surface thereof may be formed.

For example, the reaction may be carried out under conditions at pH of about 10 or greater, a temperature of about 150 to 180° C. and a reaction time of about 2 to 5 hr. After termination of the reaction, passive cooling to a temperature of about 20 to 25° C. may be performed.

Alternatively, NaOH may be added at the beginning of the reaction to adjust the pH.

The first complex may suitably include an amount of about 1 to 50 wt %, or particularly an amount of about 10 to 30 wt %, of the metal catalyst particles, based on the total weight of the first complex. When the amount of the metal catalyst particles is greater than about 50 wt %, the metal catalyst particles are not dispersed properly and thus may not be uniformly attached to the surface of the oxide particles.

The metal catalyst particles formed on (attached to) the surface of the oxide particles may suitably have a size of about 2.0 to 3.0 nm.

Preparing a Second Composition

A conductive support may be dispersed in a second solvent component, thus manufacturing a second composition. Preferably, the second solvent component, which may be different from the first solvent component contained in the first composition, may be used in order to improve the dispersibility of the conductive support, which has a hydrophobic surface. Preferably, the second solvent component may include one or more selected from the group consisting of water, a second alcohol solvent (low-boiling point alcohol) and combinations thereof.

The low-boiling-point alcohol preferably may suitably include ethanol.

The pH of the second composition may be about 8 or less.

The conductive support may be preferably a carbon support, and the carbon support may include one or more selected from the group consisting of graphite, carbon black, acetylene black, Denka black, Ketjen black, activated carbon, mesoporous carbon, carbon nanotubes, carbon nanofibers, carbon nanohorns, carbon nanorings, carbon nanowire, fullerene, and Super P black.

Forming a Second Complex

The first complex may be supplied to the conductive support contained in the second composition, thus manufacturing a second complex. Ultimately, the dual catalyst may be formed.

Preferably, the second complex may be formed by steps including: preparing an admixture including the first complex and the second composition, for example, by adding or supplying the first complex to the second composition; performing acid treatment; aging the admixture; and obtaining a solid by filtering the admixture.

The second composition may suitably include weakly basic, and may be required to become acidic in order to manufacture the second complex. For example, the second composition may be added with the first complex to afford the admixture, which may be then treated with about 0.1 to 0.5 M acid, such as sulfuric acid, nitric acid, hydrochloric acid or acetic acid, thereby essentially lowering the pH of the reaction condition to about 1 to 2.

Accordingly, the pH of the second composition may be about 7 to 8, and the pH of the admixture may be about 0 to 2, or particularly of about 0 to 1.

Preferably, aging the admixture for a predetermined time may be required.

Through the above procedures, by virtue of Van der Waals attraction force between the surface of the conductive support and the surface of the first complex, agglomeration of particles may be suppressed, and moreover, the first complex may be supported on the conductive support.

The admixture may be aged with stirring for 10 hr to 48 hr. Here, stirring may be performed using a magnetic stirrer at a rate of 5 to 1,500 rpm and a temperature of 20 to 30° C.

Without the stirring during the aging process, solids contained in the admixture may not be uniformly formed.

After the aging process, the resulting admixture may be filtered using a vacuum filter, thus yielding a solid.

The anode dual catalyst for a fuel cell according to an exemplary embodiment of the present invention may include a first complex including the metal catalyst particles and the oxide particles, and a conductive support having the first complex attached to the surface thereof, the metal catalyst particles being attached to the surface of the oxide particles.

Figure 2:
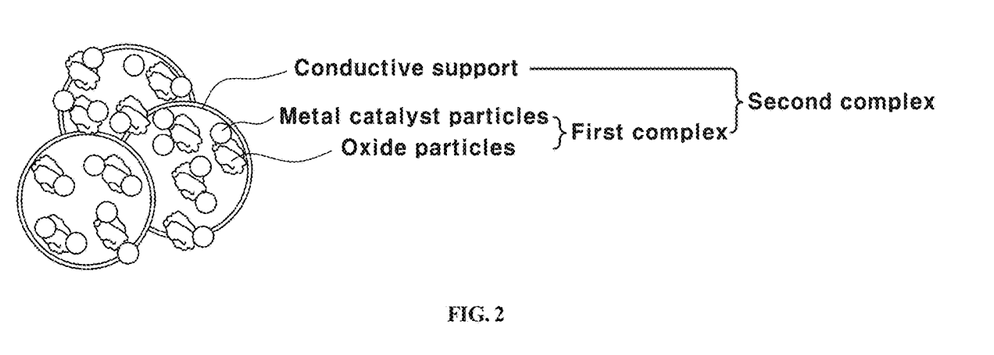
FIG. 2 shows an exemplary dual catalyst according to an exemplary embodiment of the present invention.

FIG. 2 shows an exemplary dual catalyst according to an exemplary embodiment of the present invention. With reference thereto, it can be seen that oxide particles and metal catalyst particles are supported on (attached to) a conductive support, and more particularly, one or more metal catalyst particles are attached to oxide particles, and multiple oxide particles having the metal catalyst particles attached thereto are attached to the surface of the conductive support. As such, for the catalytic reaction, the metal catalyst particles may abut both the oxide particles and the conductive support.

The particle sizes of the metal catalyst particles, the oxide particles and the conductive support may be preferably represented by Equation 1 below.

$$\text{Metal catalyst particles} \leq \text{Oxide particles} < \text{Conductive support} \quad [\text{Equation 1}]$$

In other words, the sizes of the metal catalyst particles may be equal to or less than the size of the oxide particles; and the size of the oxide particles may be less than the size of the conductive support The dual catalyst of the present invention, including the metal catalyst particles, the oxide particles and the conductive support, may suitably have an average particle size of 5 to 10 nm.

The metal catalyst particles of the present invention may be located at the anode to oxidize hydrogen ($H_2$) gas introduced from the outside to thereby generate electrons ($e^-$) and protons ($H^+$), and the oxide particles decompose water ($H_2O$) generated as the reaction product in the fuel cell to thus generate oxygen ($O_2$). The two catalysts, which play different roles at the anode, may be effectively supported on the conductive support of the present invention.

EXAMPLE

A better understanding of the present invention will be given through the following examples, which are merely set forth to illustrate the present invention but are not to be construed as limiting the scope of the present invention.

Example 1

A first composition was manufactured by dispersing an iridium oxide powder in a solvent including ethylene glycol (a first solvent component) alternately using a magnetic stirrer and an ultrasonic disperser, after which the first composition was passed twice through a nano disperser equipped with a 100 microfilter at 400 bar. Here, the iridium oxide solid content was 5 wt % based on the total weight of the first composition.

A platinum chloride precursor was quantified so as to support 0.3 g of platinum particles on 0.7 g of iridium oxide and was then added to the first composition. Thereafter, the initial pH was adjusted to 11 with NaOH. The reaction between the platinum chloride precursor and the iridium oxide was carried out at a temperature of 160° C. for 3 hr using a heating mantle in a three-neck glass bottle flask. After termination of the reaction, passive cooling to a temperature of 25° C. was performed, thus manufacturing a first complex.

A second composition was manufactured by dispersing a carbon support in a solvent including distilled water and ethanol in a separate beaker, and magnetic stirring and ultrasonic dispersion were alternately performed, as in the first composition.

The first complex was added to the second composition, and a 0.2 M sulfuric acid aqueous solution was added dropwise by 0.2 ml each for 10 min to adjust the pH to 1 to give a mixed solution. Thereafter, the mixed solution was stirred at 800 rpm at a temperature of 25° C. for 24 hr using a magnetic stirrer. In this procedure, the first complex was supported on the carbon support to form a second complex.

Figure 3:
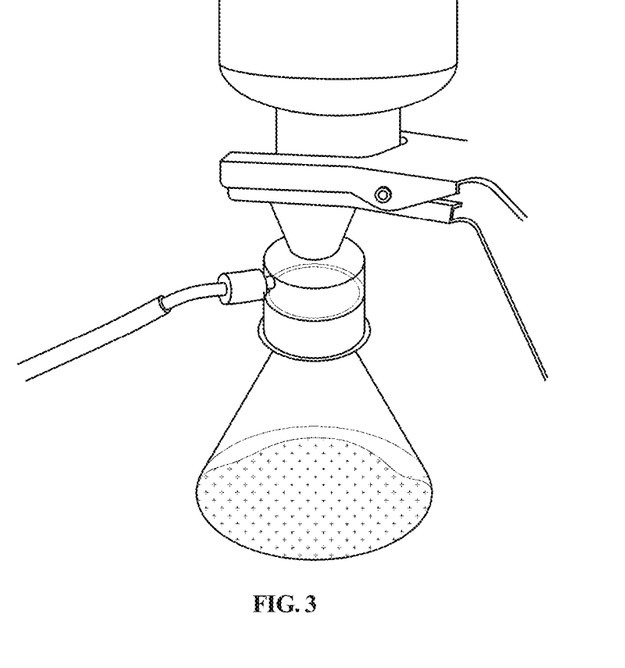
FIG. 3 shows an exemplary solid obtained using an exemplary vacuum filter in Example 1 according to an exemplary embodiment of the present invention.
Figure 4:
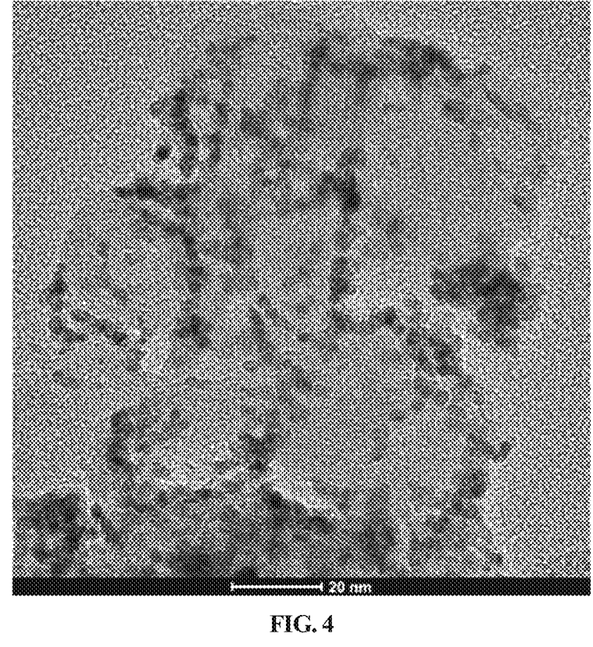
FIG. 4 is a high-resolution transmission electron microscope (HR-TEM) image of an exemplary dual catalyst manufactured in Example 1 according to an exemplary embodiment of the present invention.

The solution including the second complex was filtered using a vacuum filter to obtain a solid (dual catalyst including the second complex). FIG. 3 shows the filtering process for obtaining a solid using a vacuum filter. With reference thereto, it can be seen that the second complex, which is colored black, was filtered on the filter, and a transparent filtrate excluding a solid was collected below the filter. Then, the remaining acid solution was removed several times with distilled water. As such, the solid was re-dispersed using ultrasonic waves so that the surface thereof was thoroughly washed. The second complex was dried in a vacuum oven, ground and stored in a closed container. The dual catalyst thus manufactured was observed with HR-TEM, which is illustrated in FIG. 4.

Figure 5:
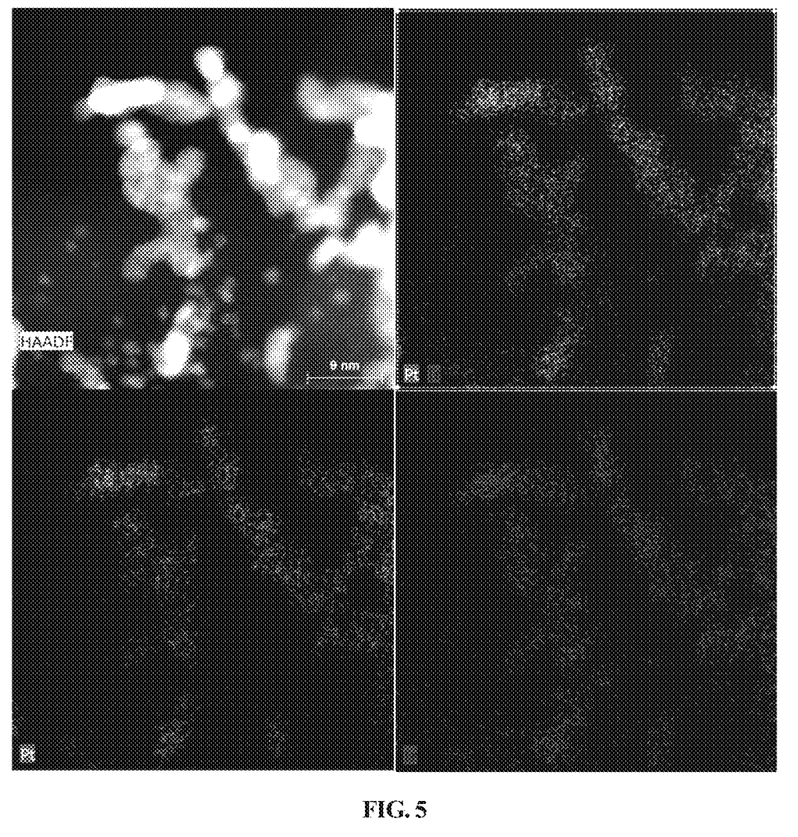
FIG. 5 is scanning electron microscope (SEM) and energy dispersive spectroscopy (EDS) images of an exemplary dual catalyst manufactured in Example 1 according to an exemplary embodiment of the present invention.
Figure 6:
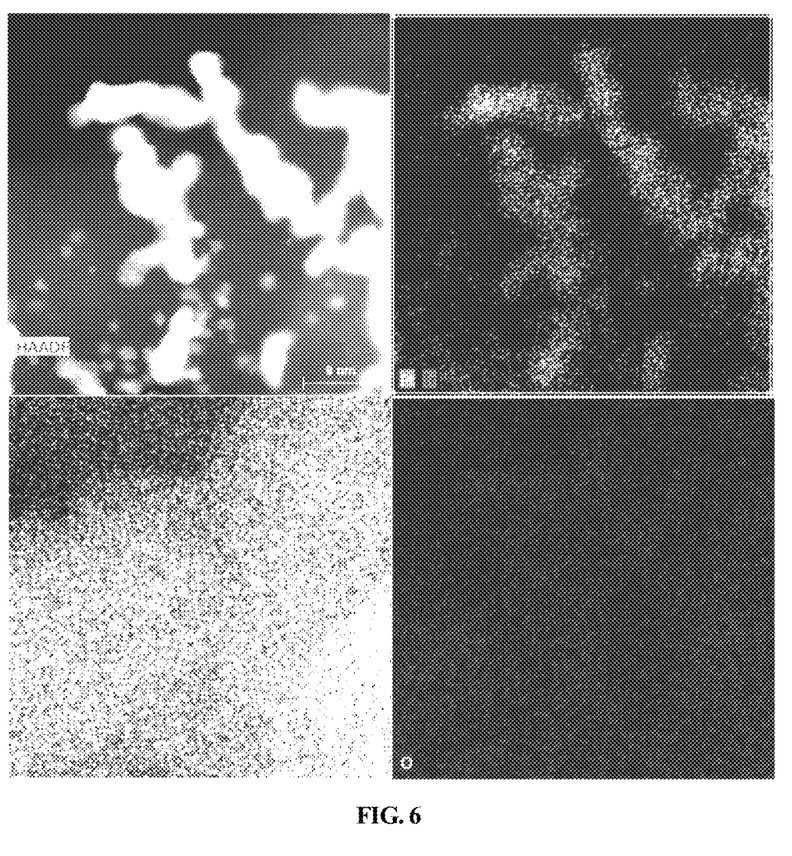
FIG. 6 is SEM and EDS images of an exemplary dual catalyst manufactured in Example 1 according to an exemplary embodiment of the present invention.

FIGS. 5 and 6 are SEM and EDS images of the dual catalyst manufactured above.

As shown in FIGS. 5 and 6, the manufactured dual catalyst was configured to include platinum (Pt), iridium oxide ($IrO_2$) and carbon (C). Particularly, as shown in FIG. 6, all of the carbon was widely distributed, and as shown in FIG. 5, platinum and iridium oxide were evenly distributed at substantially overlapping positions on the carbon. Based on this structure, it can be inferred that the dual catalyst of the present invention advantageously acts to facilitate the oxygen evolution reaction.

Figure 7:
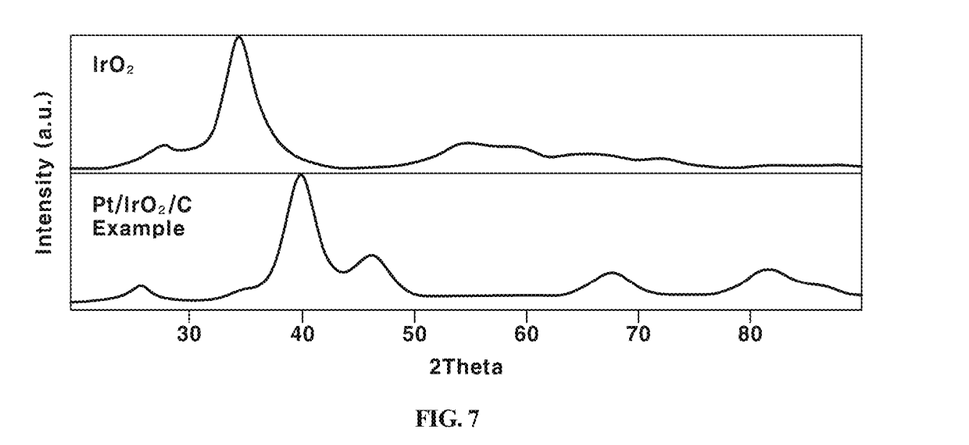
FIG. 7 shows an X-ray diffraction (XRD) pattern graph of an exemplary dual catalyst manufactured in Example 1 according to an exemplary embodiment of the present invention.

FIG. 7 shows the XRD pattern graph for analysis of the crystal structure and nanoparticle size of the dual catalyst. With reference thereto, it can be seen that the crystallinity of the platinum particles is well formed through the main crystal peak analysis. Moreover, the nanoparticle size was calculated using the Debye-Scherrer equation based on the peak between 67 and 68 degrees. The results are shown in Table 1 below. The dual catalyst contains iridium oxide, so it can be seen that it includes a weak main peak of iridium oxide corresponding thereto.

TABLE 1

|  | 2T (degree) | FWHM (degree) | Particle size (nm) |
|---|---|---|---|
| Example 1 | 67.85 | 3.90 | 2.6 |

Comparative Examples 1 to 3

The catalysts of Comparative Examples 1 to 3 were manufactured so as to have the structures shown in Table 2 below.

TABLE 2

|  | Catalyst structure |
|---|---|
| Example 1 | Pt/$IrO_2$-supported C |
| Comparative Example 1 | Pt-supported C |
| Comparative Example 2 | Mixture of Pt-supported C and $IrO_2$ |
| Comparative Example 3 | Pt-supported C and $IrO_2$ complex (C + $IrO_2$) |

Figure 8:
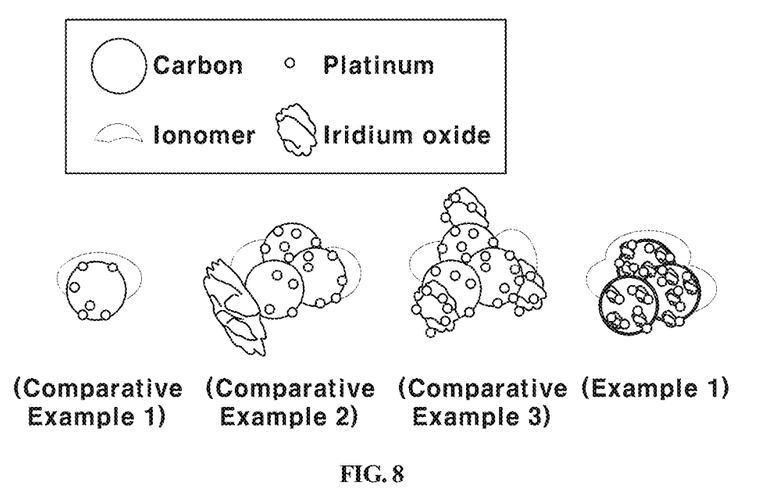
FIG. 8 shows structures of the catalysts manufactured in Example 1 according to an exemplary embodiment of the present invention and Comparative Examples 1 to 3.

The catalyst structures of Example 1 and Comparative Examples 1 to 3 are shown in FIG. 8.

Comparative Example 4

Figure 9:
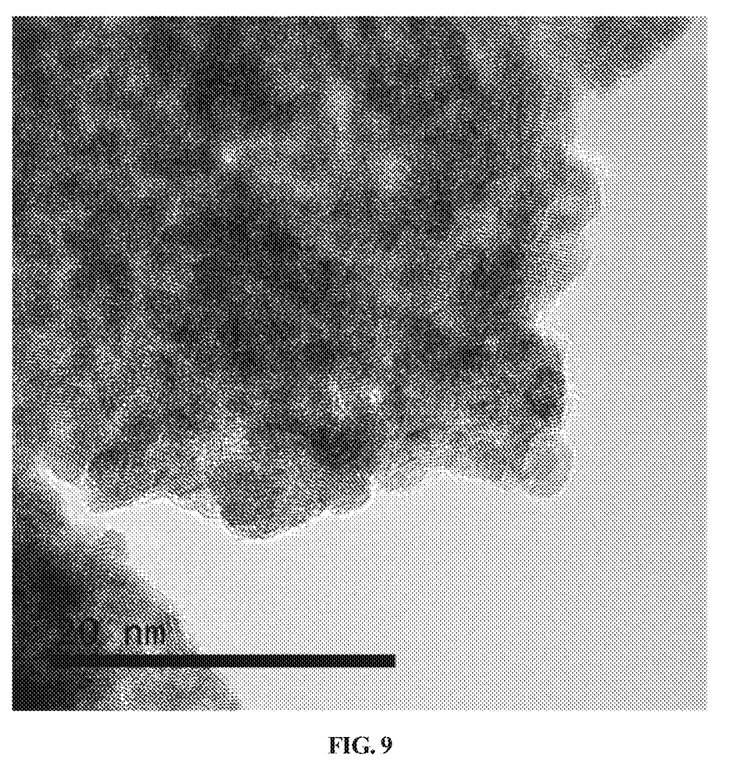
FIG. 9 is an HR-TEM image showing a portion of the dual catalyst manufactured in Comparative Example 4.

A second complex was formed in the same manner as in Example 1, with the exception that re-dispersion of the first composition using a nano disperser was omitted, after which a solid was obtained from the second complex using a vacuum filter. FIG. 9 is an HR-TEM image showing the portion of the dual catalyst of Comparative Example 4, in which the iridium oxide was not evenly dispersed in the form of particles but the iridium oxide particles were agglomerated with each other, thereby enlarging particles.

Comparative Example 5

Figure 10:
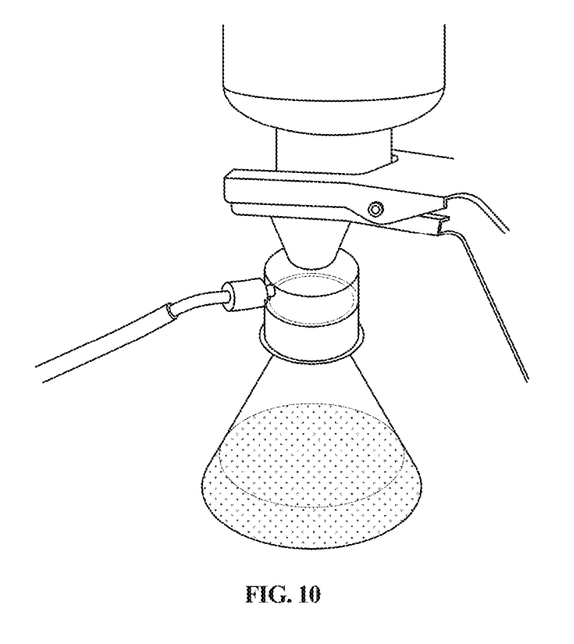
FIG. 10 shows a solid obtained using a vacuum filter in Comparative Example 5.

A second complex was formed in the same manner as in Example 1, with the exception that stirring of the mixed solution for 24 hr using a magnetic stirrer was omitted, after which a solid was obtained from the second complex using a vacuum filter. FIG. 10 shows the filtering process for obtaining a solid using a vacuum filter. With reference thereto, it can be seen that when the mixed solution was directly filtered using a vacuum filter without aging for 24 hr, most of the iridium oxide and platinum particles that were not supported on the carbon support were collected below the filter without filtration by the filter, so that the filtrate was colored black.

Comparative Example 6

Figure 11:
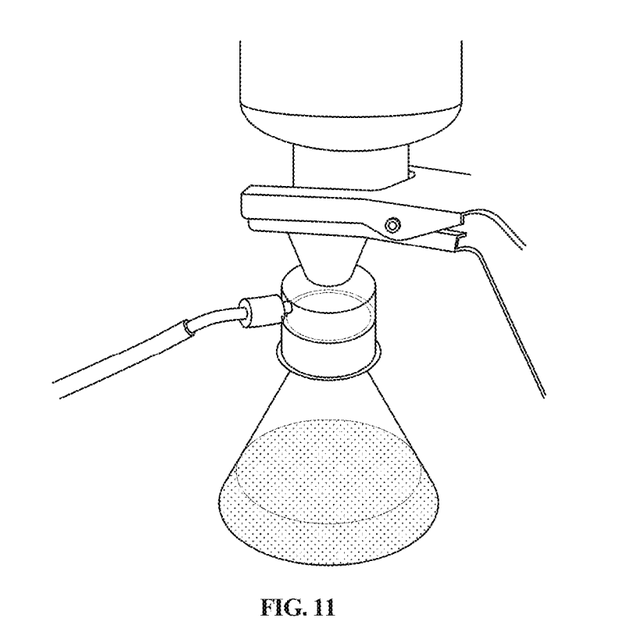
FIG. 11 shows a solid obtained using a vacuum filter in Comparative Example 6.

A second complex was formed in the same manner as in Example 1, with the exception that acid treatment was omitted upon forming the second complex, after which a solid was obtained from the second complex using a vacuum filter. As shown in FIG. 11, the color of the filtrate filtered through the filter was brown, indicating that the yield of iridium oxide and platinum supported on the carbon support was lowered because the pH of the mixed solution was not adjusted to fall within the acidic range.

Test Example

Figure 12:
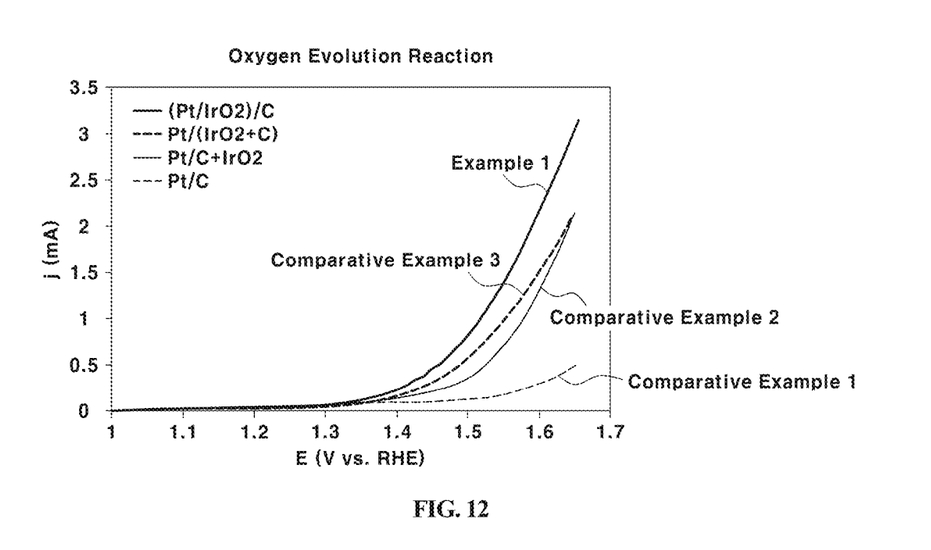
FIG. 12 shows a rotating ring-disk electrode (RDE) linear sweep voltammetry (LSV) graph of the catalysts manufactured in Example 1 according to an exemplary embodiment of the present invention and Comparative Examples 1 to 3.

The results of oxygen evolution activity of the catalysts of Example 1 and Comparative Examples 1 to 3 were compared, and the RDE (rotating ring-disk electrode) LSV (linear sweep voltammetry) graph thereof is shown in FIG. 12.

In Comparative Example 1 containing no RTA catalyst, the lowest current density value was exhibited at the same voltage and the oxygen evolution reaction did not occur. In Comparative Example 2, in which the electrode was manufactured by adding RTA catalyst iridium oxide, the current density value increased from 0.09 to 0.14 mA at 1.4V, and the oxygen evolution reaction occurred. Meanwhile, in Example 1, in which the platinum element and the iridium element were evenly dispersed on the atomic scale as confirmed through nanostructure analysis, the highest current density value was exhibited at the same voltage and the best oxygen evolution activity was manifested, indicating that the effects thereof were approximately doubled compared to the simple mixture. Thereby, it is possible to provide a method of manufacturing a catalyst capable of preventing a reverse voltage phenomenon due to local hydrogen fuel depletion in the method of manufacturing an anode catalyst for a fuel cell, and also to provide a method of maximizing the function of the oxygen evolution catalyst by controlling the distribution of metal catalyst particles, acting as active reaction sites, on a nano scale.

Although the various exemplary embodiments of the present invention have been disclosed for illustrative purposes, those skilled in the art will appreciate that various modifications are possible without departing from the scope and spirit of the invention as disclosed in the accompanying claims, and such modifications should not be understood separately from the technical ideas or essential characteristics of the present invention.

What is claimed is:

1. A method of manufacturing an anode dual catalyst for a fuel cell, comprising:
    preparing a first composition by admixing materials comprising oxide particles and a first solvent component;
    forming a first complex by admixing materials comprising the dispersed oxide particles with a metal precursor;
    preparing a second composition by admixing materials comprising a conductive support and a second solvent component; and
    forming a second complex by combining the first complex and the second composition,
    wherein the method further comprises filtering the prepared first composition through a filter by applying pressure to the first composition.

2. The method of claim 1, wherein the first composition comprises the oxide particles in an amount of about 0.3 to 10 wt % based on the total weight of the first composition.

3. The method of claim 1, wherein the first solvent component comprises a first alcohol solvent.

4. The method of claim 1, wherein the filter comprises a mesh having a sieve size of about 100 to 200 μm.

5. The method of claim 1, wherein a pressure of about 10 to 1,500 bar is applied to the first composition so that the first composition passes through the filter at a rate of about 50 to 100 ml/min.

6. The method of claim 1, wherein the preparing the first complex comprises:
    preparing a metal precursor; and
    forming metal catalyst particles on a surface of the oxide particles by reacting the metal precursor with the oxide particles.

7. The method of claim 6, wherein the metal catalyst particles have a size of about 2.0 to 3.0 nm.

8. The method of claim 6, wherein the first complex comprises the metal catalyst particles in an amount of about 1 to 50 wt % based on the total weight of the first complex.

9. The method of claim 6, wherein the metal precursor with the oxide particles is reacted at a pH of about 10 or greater and a temperature of about 150 to 18° C. for about 2 to 5 hr.

10. The method of claim 1, wherein the second solvent component comprises distilled water, a second alcohol solvent and combinations thereof.

11. The method of claim 1, wherein the preparing the second complex comprises:
    preparing an admixture comprising the first complex and the second composition by performing acid treatment;
    aging the admixture; and
    obtaining a solid by filtering the mixed solution.

12. The method of claim 11, wherein the second composition has a pH of about 7 to 8 and the admixture has a pH of about 0 to 2.

13. The method of claim 11, wherein in the aging the mixed solution, the admixture is aged with stirring for about 10 hr to 48 hr.

* * * * *